United States Patent [19]
Pommellet et al.

[11] 3,982,430
[45] Sept. 28, 1976

[54] PROCESS AND DEVICE FOR IMMOBILIZING A MOBILE COMPONENT OF A TIRE TESTIG DEVICE RELATIVE TO A FIXED COMPONENT THEREOF

[75] Inventors: Olivier Pommellet, St.-Cloud; Guy Drioton, Rueil-Malmaison, both of France

[73] Assignees: Regie Nationale des Usines Renault, Billancourt; Automobiles Peugeot, Paris, both of France

[22] Filed: Dec. 30, 1975

[21] Appl. No.: 645,452

[30] Foreign Application Priority Data
June 6, 1973 France ............................. 73.20621
June 6, 1973 France ............................. 73.21137

Related U.S. Application Data
[63] Continuation-in-part of Ser. No. 477,001, June 6, 1974, abandoned, and a continuation-in-part of Ser. No. 477,002, June 6, 1974, Pat. No. 3,937,076.

[52] U.S. Cl. ......................................... 73/146; 269/7
[51] Int. Cl.² ...................................... G01M 17/02
[58] Field of Search ............. 73/146, 573, 460, 457; 269/7

[56] References Cited
UNITED STATES PATENTS
| | | | |
|---|---|---|---|
| 2,624,107 | 1/1953 | Carpenter | 269/7 |
| 3,937,076 | 2/1976 | Pommellet et al. | 73/146 |

*Primary Examiner*—Donald O. Woodiel
*Attorney, Agent, or Firm*—Fitzpatrick, Cella, Harper & Scinto

[57] ABSTRACT

A mobile element of a tire testing device is immobilized relative to a bath of an eutectic alloy by cooling the eutectic alloy to a temperature below its solidus/liquidus, and the mobile element is released by reheating the eutectic alloy to above its solidus/liquidus. Immobilization and release are effected by means of a jacket passing hot or cold fluid.

10 Claims, 4 Drawing Figures

PROCESS AND DEVICE FOR IMMOBILISING A MOBILE COMPONENT OF A TIRE TESTING DEVICE RELATIVE TO A FIXED COMPONENT THEREOF

BACKGROUND OF THE INVENTION

This application is a Continuation-In-Part of copending U.S. patent application Ser. No. 477,001, filed June 6, 1974, now abandoned, and Ser. No. 477,002, filed June 6, 1974, now U.S. Pat. No. 3,937,076.

The present invention relates to a process and a device for immobilizing a mobile component relative to a fixed component and which may, for example, be used in the tire testing device of copending application Ser. No. 477,002, entitled "Device for Testing Tyres for Vehicles" with Olivier Pommellet and Guy Drioton as inventors, filed June 6, 1974 and based upon French Patent Application No. 73.20621.

Various mechanical, hydraulic or electromechanical devices are known for immobilizing a mobile component relative to a fixed component, but they are complicated and of dubious effectiveness.

SUMMARY OF THE INVENTION

According to the present invention we provide a process for immobilizing a mobile component of a tire testing device relative to a fixed component thereof in which the mobile component is immersed in a bath of an eutectic alloy contained in a fixed receptacle relative to which the mobile component is to be immobilized and the eutectic alloy is cooled to solidify same at a constant temperature without passing through a pasty state thereby providing the required bond or lock between the mobile component and the fixed receptacle.

The invention also provides a device for immobilizing a mobile component of a tire testing device relative to a fixed component thereof, comprising a receptacle containing an eutectic alloy, means for heating the wall of the receptacle, and a component of the tire testing device mounted movably within the receptacle. When the eutectic alloy is cooled, it solidifies at a constant temperature without passing through a pasty state and provides the bond between the mobile component and the fixed receptacle.

This arrangement makes it possible, merely by cooling the eutectic alloy, to lock or bond the mobile component to the fixed component, and by reheating the eutectic it is possible to free the mobile component for movement relative to the fixed component. Desirably, the eutectic may be cooled or heated by passing a cooled or heated fluid through a coil around the receptacle.

There has thus been outlined the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that this invention may be utilized as a basis for designing other structures and methods for carrying out the several purposes of this invention. It is therefore important that the claims be regarded as including such equivalent constructions and methods as to not depart from the spirit and scope of the invention.

BRIEF DESCRIPTION OF THE DRAWINGS

One embodiment of the invention has been chosen for purposes of illustration and description, and is shown in the accompanying drawings forming a part of the specification wherein.

DETAILED DESCRIPTION OF THE PREFERRED EMBODIMENT

Figure 1:
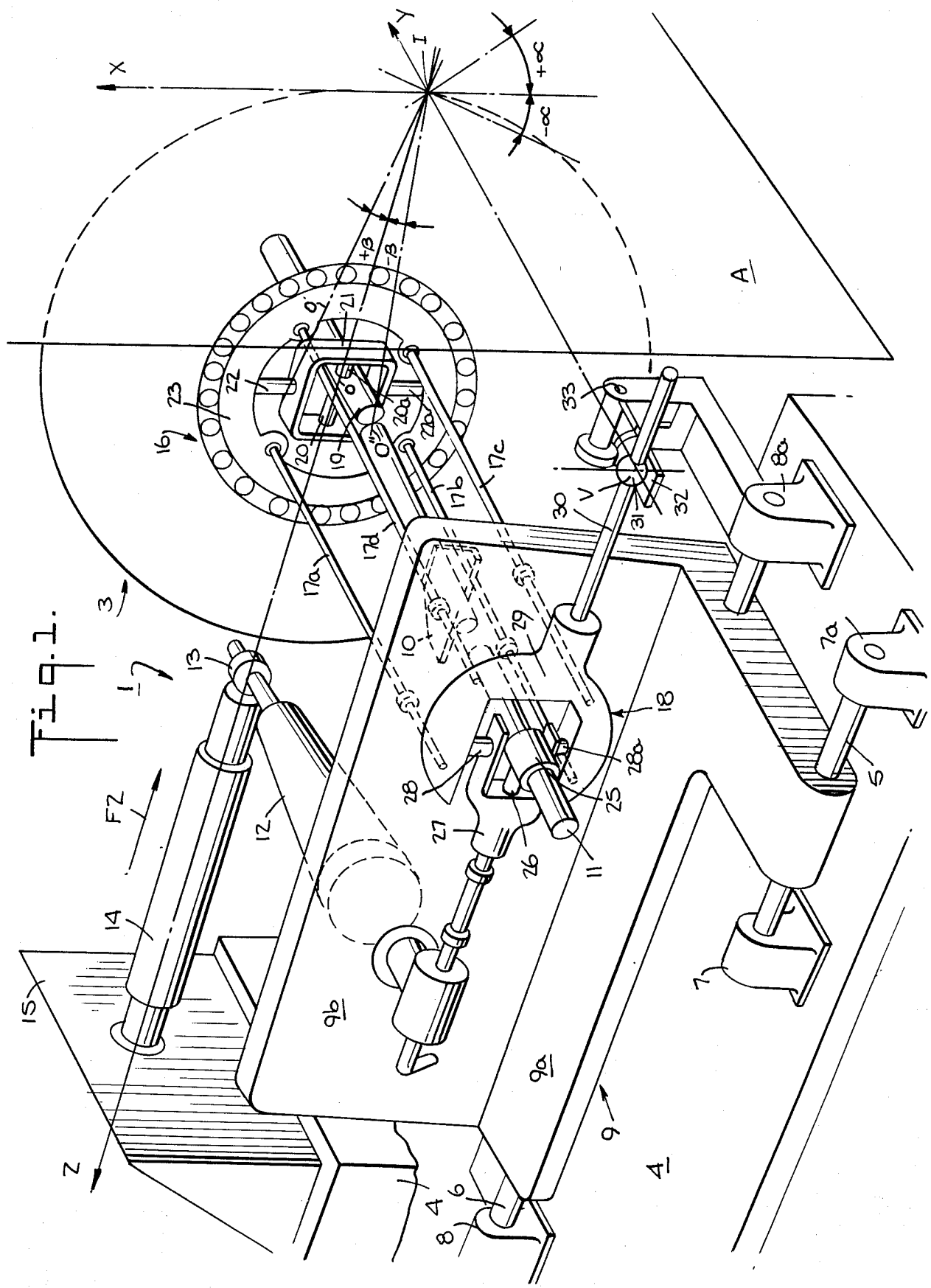
FIG. 1 is a perspective view of a tire testing device which may incorporate an eutectic bath.
Figure 2:
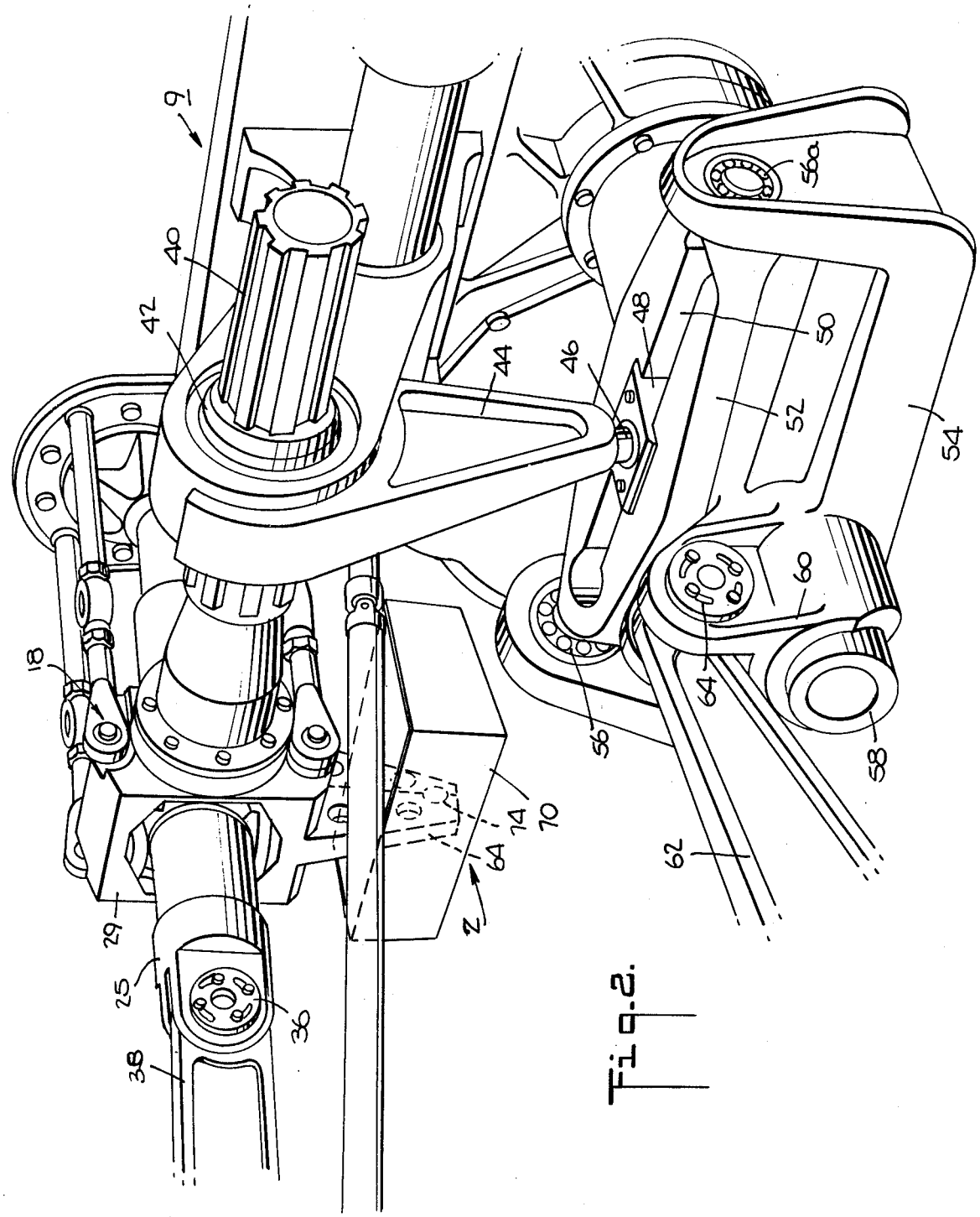
FIG. 2 is a perspective view of the alignment means for the tire testing device of FIG. 1 and incorporating an eutectic bath.

As shown in FIGS. 1 and 2, there is provided a tire testing device together with an eutectic bath 2.

The tire testing device maintains the tire of an experimental wheel 3, represented in FIG. 1 by its tread median circumference, in contact with a vertical plane A. When the axis of wheel 3 is horizontal, the angle of lock $\alpha$, or toe-in, is zero and when the axis is parallel to the plane A, the camber angle $\beta$ is zero.

The point of contact between the tire and plane A may for example be formed by the peripheral surface of a rotating drum (not shown) having a horizontal axis.

The tire testing device 1 includes a base 4 to which is fastened a pair of parallel slide-bars 5 and 6 fixed to the base by support members 7, 7a, 8 and 8a.

A carriage 9, consisting of a horizontal portion 9a forming a guide on the slide-bars 5, 6 and a vertical portion 9b acting as a support for the components of the device for supporting a wheel and tire combination, is mounted so as to slide on the slide-bars 5 and 6, in a direction parallel to the axis IZ.

A shaft 11, having a longitudinal axis parallel to the axis IY, is fastened by means of straps and tabs 10 to the vertical portion 9b of the carriage 9.

When the angle of lock $\alpha$ and the camber angle $\beta$ are zero, the experimental wheel 3 extends in a vertical plane perpendicular to the plane A at the zone of contact. The tread of the tire on the wheel 3 is thus tangential to the plane A at the point of contact. The horizontal axis IZ, parallel to the slide-bars 5 and 6, IY, parallel to the shaft 11, and IX, parallel to the tread movement at the median plane of the tire, form a reference system.

A column 12 is fixed to the vertical portion 9b of the carriage and has its axis parallel to that of the shaft 11, the column ending in a tip 13 to which there is fastened by means of a ball and socket connection, a fluid pressure operated jack 14 which rests on a support 15 fastened to base 4. This jack 14, the axis of which coincides with the axis OZ, makes it possible to load the tire at position I with a force FZ which is always perpendicular to the plane A. The combination consisting of the column 12, the carriage 9 and the shaft 11 is rigid and therefore the force provided by the jack 14 does not impose any transverse force component on the translation slidebars 5 and 6, which, at least during static operation, serve only to support the weight of the mobile equipment.

The shaft 11 carries on the outside a non-rotating hub gimballing orienting wheel hub 16 by means of which the wheel and tire combination 3 is mounted on the shaft 11. For orienting the wheel at an angle of lock $\alpha$ and a camber angle $\beta$ this wheel hub 16 is connected by rods or tie-bars 17a, 17b, 17c and 17d to an aligning hub 18. (FIGS. 1 and 2).

The wheel hub 16 comprises a ball bearing sleeve 19 slidable along the shaft 11 pivotally carrying a first pair of journals 20 and 20a supporting a cage 21 carrying a second pair of journals 22 and 22a, the common axis of which is perpendicular to the axis common to the journals 20 and 20a of the first pair. On the journals 22 and 22a, there is pivotally mounted a ring 23 to which the rods or tie-bars 17a, 17b, 17c and 17d are connected by means of ball-and-socket joints, and which receives the wheel 3 which can rotate freely by virtue of a ring of balls 24.

The aligning hub 18 comprises a ball bearing sleeve 25 which is slidable along the shaft 11 like the sleeve 19, and which carries a journal 26 on which is pivotally mounted a bifurcated carrier 27 which has a pair of journals 28 and 28a, extending outwardly therefrom on an axis perpendicular to the axis of the journal 26. The journals 28 and 28a receive a further bifurcated carrier 29 onto which the other ends of the rods or tie-bars 17a, 17b, 17c and 17d are articulated by means of ball-and-socket joints.

The carrier 29 carries a rod 30 extending along an axis perpendicular to the axis of the journals 28 and 28a and able to slide in a ball-and-socket joint 31, which is itself shiftable vertically on a lever 32 hinged to the frame 4 about an axle 33, parallel to the axis IZ.

As shown in FIG. 2, the sleeve 25 which makes it possible to control the camber angle $\beta$ by means of the aligning hub 18, is connected via hinge 36 to a connecting rod 38, capable of a reciprocating movement of variable amplitude and actuatable by any conventional means.

The carrier 29 which makes it possible to control the angle of lock $\alpha$ is firmly fixed to a splined shaft 40 on which is slidably mounted a ring 42, which ring has corresponding splines and is firmly fixed to a lever 44. The lever 44 has an axle 46 on which is pivotally mounted a sliding-block 48 inserted in a groove 50 of a member 52 mounted on a U-shaped component 54 by means of bearings 56 and 56a, for oscillatory rotation about an axis parallel to that of the splined shaft 40.

The U-shaped component 54 is itself slidably mounted on a rod 58 firmly fixed to the wheel-supporting carriage 9 along an axis perpendicular to both the axes of the splined shaft 40 and the groove 50.

The U-shaped component 54 has an arm 60 to which a connecting rod 62 is hinged by means of an axle 64, the connecting rod 62 being identical to the connecting rod 38 and being controlled in the same way.

Finally, carrier 29 includes a component 64 which is positioned without the eutectic bath 2.

In operation, connecting rods 38 and 62 are moved to position the wheel 3 in a position relative to plane A for testing. It will be appreciated that carrier 29 together with component 64 are universally moveable and that eutectic bath 2 is of a size and shape to accommodate the movement of component 64 therein. Once the wheel 3 is properly positioned for testing, the bath is cooled below the solidus/liquidus of the eutectic alloy to immobilize the component 64 and thereby also immobilize the wheel during the testing operation.

Once the test is completed, the bath is heated and component 64 is freed for movement to alternate testing positions.

Figure 3:
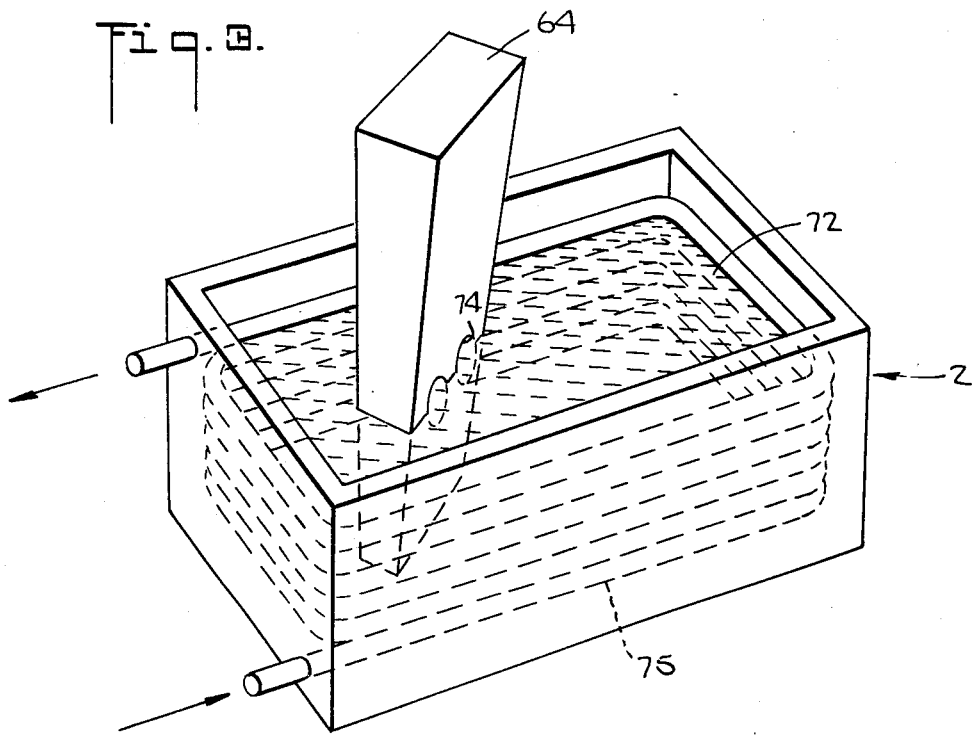
FIG. 3 is a perspective view of an eutectic bath according to the instant invention and showing a moveable component of the tire testing device positioned therein.

Turning to FIG. 3 there is shown an eutectic bath 2 including a fixed tank or receptacle 70 which contains a given amount of a eutectic alloy 72 in which can be immersed mobile component 64 which may be provided with holes 74 to improve the keying between the eutectic alloy 72 and the mobile component 64. A coil 75, through which can flow a heating or cooling fluid is provided in the wall of the tank 70. As shown in FIG. 2, the mobile component 64 is mounted to carrier 29 for universal movement in response to movements of rods 38 and 62.

By way of example, the eutectic alloy 72 may have the following composition:

| | |
|---|---|
| Tin | 8.3% |
| Bismuth | 44.7% |
| Lead | 22.6% |
| Cadmium | 5.3% |
| Indium | 19.1% |

This composition gives a liquidus/solidus at 47°C, a temperature which is particularly suitable when the heating fluid is aqueous, for example water alone.

The eutectic is kept in its liquid phase by passing a fluid at a temperature above the liquefaction and solidification point through the coil 75, and the mobile component 64 is immersed in the liquid eutectic alloy. Thereafter, the hot fluid flowing through the coil is replaced by a cold fluid so as to bring the eutectic alloy to below its solidification point, in such a way that the solidification eutectic alloy composition locks or bonds the mobile component 64 and the fixed tank 70.

Figure 4:
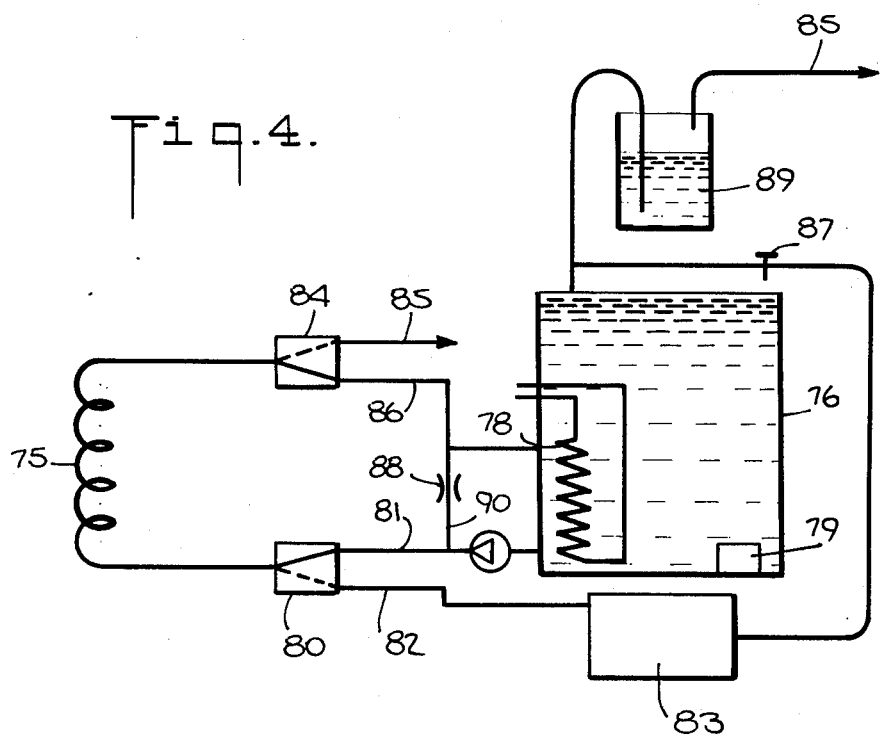
FIG. 4 is a schematic of a fluid circuit for supplying control fluid to the eutectic bath.

One embodiment of the circuit for supplying the coil 75 with fluid has been represented in FIG. 4 and comprises a closed reservoir 76 supplied with tap water via the tap 87 and surmounted by an expansion tank 89 having an overflow conduit 85. The reservoir 76 contains an electrical resistance heater 78 and a thermostat 79.

The water from the reservoir 76 is driven in pulses by means of a pump 77 through a conduit 81 towards an electro-magnetically operated valve 80 placed at the inlet to the coil 75, the valve 80 having a further inlet connected via a conduit 82 to a source of cold tap water 83. At its outlet, the coil 75 is connected to a second electro-magnetically operated valve 84 which has one of its outlet orifices connected to a discharge conduit 85 and the other outlet orifice connected, via a conduit 86, to the reservoir 76. The conduit 81 is connected across to the conduit 86 via a bypass conduit 90 equipped with a throttle 88.

In order to operate the eutectic bath, the pump 77 is started up and the electrical resistance heater 78 is energized with electric current in order to heat the water in the reservoir 76 to a predetermined temperature which is controlled by the thermostat 79.

When it is desired to supply the coil 75 with hot fluid, the electro-magnetically operated valves 80 and 84 are de-energized and are in the position represented by the solid line in FIG. 4 in which the reservoir 76 is connected via the conduits 81 and 86 to the coil 75.

If, on the other hand, it is desired to supply the coil 75 with cold fluid to immobilize the component 64, a voltage is applied to the electro-magnetically operated valves 80 and 84 which take up the position represented by the broken line, in which position the source of cold water 83 is connected via the conduit 82 to the inlet of the coil 75, the outlet of which is connected to waste via its discharge conduit 85.

When cold water is flowing, the pump 77 continues to operate to circulate the hot water from the reservoir 76 through the throttle 88 in conduit 90 and through conduit 86 so that the temperature of the hot water remains uniform.

The eutectic alloy has a single temperature at which it changes from solid to liquid without passing through an intermediate, pasty state. Thus, above the solidus/liquidus temperature, the alloy is entirely liquid, allowing free movement of the mobile component 64, and below that same temperature the alloy solidifies to thereby lock the mobile component within the bath.

Having thus described the invention with particular reference to the preferred form thereof, it will be obvious to those skilled in the art to which the invention pertains, after understanding the invention, that various changes and modifications may be made herein without departing from the spirit and scope of the invention as defined by the claims appended hereto.

What is claimed and desired to be secured by Letters Patent is:

1. A process for immobilizing a mobile component of a tire testing device relative to a fixed component thereof, comprising the steps of positioning the mobile component in an eutectic bath including a liquid eutectic alloy within a fixed receptacle such that a tire associated with the device is positioned for testing, and cooling the eutectic alloy by solidifying the alloy at a constant temperature to lock the mobile component within the receptacle.

2. A process as recited in claim 1, wherein said mobile component is universally moveable and wherein said receptacle is of a size and shape to accommodate the universal movement.

3. In combination, a tire testing device including a mobile component and an eutectic bath, said eutectic bath comprising a fixed receptacle, an eutectic alloy contained within said receptacle and temperature control means for heating and cooling said alloy, said mobile component extending into said bath such that when said eutectic alloy is cooled below its solidus/liquidus, said mobile component is locked with respect to said fixed receptacle.

4. The combination as recited in claim 3, wherein said eutectic alloy consists of 8.3% tin, 44.7% bismuth, 22.6% lead, 5.3% cadmium and 19.1% indium.

5. The combination as recited in claim 3, wherein said mobile component is universally moveable and wherein said receptacle is of a size and shape to accommodate the universal movement.

6. The combination as recited in claim 3, wherein said mobile component is shaped to promote keying the mobile component within the eutectic alloy.

7. The combination as recited in claim 6, wherein said mobile component is provided with apertures to promote keying the mobile component within the eutectic alloy.

8. The combination as recited in claim 3, wherein said temperature control means comprises a jacket positioned within the walls of said receptacle and means for introducing a fluid medium into said jacket.

9. The combination as recited in claim 8 further including a first fluid source, a second fluid source, means for heating said first fluid source to a temperature higher than that of the second fluid source, a discharge conduit, first valve means connected to communicate the inlet of said jacket with either said first or said second fluid sources, and second valve means connected to communicate the outlet of said jacket with either said first fluid source or said discharge conduit.

10. The combination as recited in claim 9, wherein said first fluid source comprises a reservoir, a pump positioned between said reservoir and the inlet of said jacket and wherein said heating means comprises an electrical resistance heater and a thermostat, said heater and said thermostat being positioned within said reservoir.

* * * * *

UNITED STATES PATENT AND TRADEMARK OFFICE
CERTIFICATE OF CORRECTION

PATENT NO. : 3,982,430
DATED : September 28, 1976
INVENTOR(S) : OLIVIER POMMELLET, et al.

It is certified that error appears in the above-identified patent and that said Letters Patent are hereby corrected as shown below:

First page, bibliographic data, at "[30]", change "June 6, 1973 France .... 73.21137" to -- June 8, 1973 France .... 73.21137 --

Column 2, line 50, change "axis" to -- axes --
Column 3, line 58, change "without" to -- within --.

Signed and Sealed this

Twenty-second Day of February 1977

[SEAL]

Attest:

RUTH C. MASON
*Attesting Officer*

C. MARSHALL DANN
*Commissioner of Patents and Trademarks*